P. D. BENBOW AND W. E. BECK.
STOPPING DEVICE FOR STEERING APPARATUS.
APPLICATION FILED AUG. 4, 1920.

1,397,311. Patented Nov. 15, 1921.

WITNESSES

INVENTOR
Percy D. Benbow,
William E. Beck.
BY
ATTORNEYS

UNITED STATES PATENT OFFICE.

PERCY D. BENBOW AND WILLIAM E. BECK, OF WINSTON-SALEM, NORTH CAROLINA.

STOPPING DEVICE FOR STEERING APPARATUS.

1,397,311.

Specification of Letters Patent. Patented Nov. 15, 1921.

Application filed August 4, 1920. Serial No. 401,196.

*To all whom it may concern:*

Be it known that we, PERCY D. BENBOW and WILLIAM E. BECK, citizens of the United States, and residents of Winston-Salem, in the county of Forsyth and State of North Carolina, have invented certain new and useful Improvements in Stopping Devices for Steering Apparatus, of which the following is a specification.

Our invention relates to a stopping device for limiting the movement of a steering apparatus of an automobile to prevent locking of the apparatus in one extreme position or the other, such locking being a common occurrence particularly to Ford cars and the cause of many serious accidents.

It is a purpose of our invention to provide a stopping device of the above character which is directly attached to the front axle of an automobile and is adjustable thereon to such a point as to form an abutment for the spindle arm of the steering apparatus and to thus limit the inward movement of the arm whereby the turning of the steering apparatus beyond the dead center point with the subsequent locking of the apparatus, is positively prevented.

We will describe a portion of one form of steering apparatus and two forms of stopping devices embodying our invention and will then point out the novel features thereof in claims.

In the accompanying drawings.

Similar reference characters refer to similar parts in each of the several views.

Figure 1:
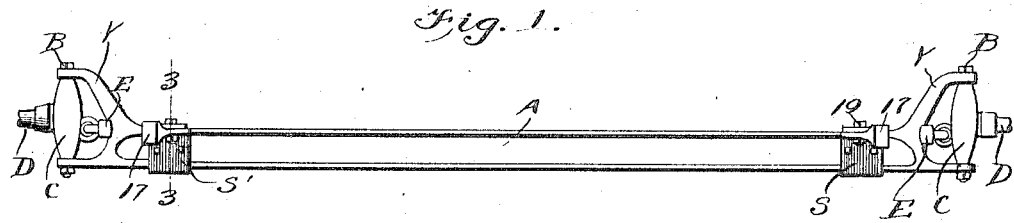
Figure 1 is a view showing in rear elevation the front axle of an automobile and the adjacent portions of a standard form of steering apparatus with two forms of stopping devices embodying our invention applied thereto.

Referring specifically to the drawings and particularly to Fig. 1, we have here shown the front axle of an automobile designated at A, such axle being formed at its opposite ends with yokes Y in which are journaled connecting bolts B embraced by body bushings C. Fixed to the body bushings C are spindles D upon which the wheels (not shown) are mounted. Fixed to the body bushings C are the spindle arms E, which are adapted to be connected to steering rods (not shown) as will be understood.

Figure 3:
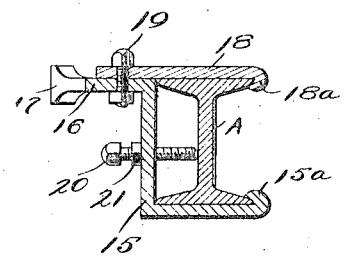
Fig. 3 is a vertical sectional view taken on the line 3—3 of Fig. 1.
Figure 4:
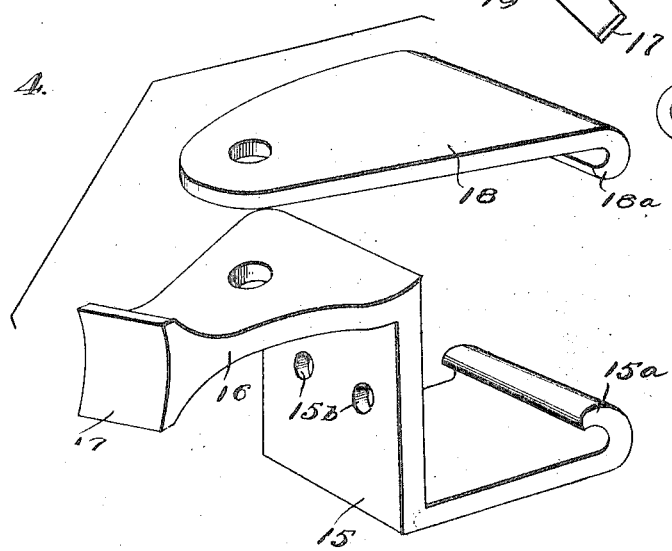
Fig. 4 is an enlarged perspective view of the stopping device shown in Fig. 2 with the parts thereof disassembled.

The stopping devices forming the subject matter of our invention are designated at S and S', and as shown in Fig. 1 are applied to the axle A at points adjacent the yokes Y. As shown to advantage in Fig. 4, each stopping device S or S' comprises an L-shaped member 15 having a curved tapered arm 16 formed in the upper end thereof and terminating in a head 17. Each device also includes a second member 18 which is in the form of a plate, such plate being curved and tapered to conform to the general curvature of the arm 16. The member 18 and the arm 16 are formed with registering openings to receive a bolt 19 as shown in Fig. 3 whereby the member can be secured to the arm in super-imposed relation and to thereby coact with the horizontal portion of the member 15 to provide a clamp for embracing the axle A. The outer edges of the members 15 and 18 are inturned to provide gripping lips 15$^a$ and 18$^a$, respectively, which are adapted to engage the edges of the axle as will be hereinafter described. The vertical portion of the member 15 is formed with a pair of openings 15$^b$ through which set screws 20 are adapted to extend and to be locked in any adjusted position by means of lock nuts 21.

The stopping devices S and S' are of identical construction with the exception that the member 18 and the arm 16 of the stop S are curved outwardly in the direction of the adjacent spindle arm E, while the member and arm of the device S' are curved oppositely in the direction of the adjacent spindle arm E.

Figure 2:
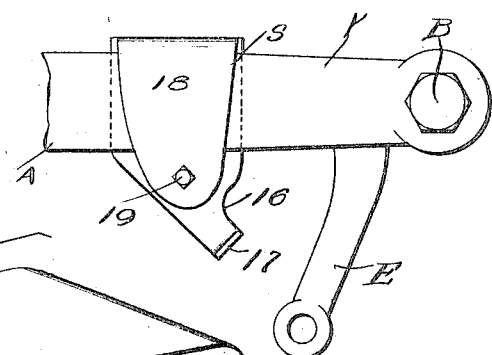
Fig. 2 is a fragmentary top plan view of a portion of the axle shown in Fig. 1 with one of the stopping devices applied thereto.

In the applied position of each stopping device as shown in Figs. 2 and 3, the horizontal portion of the member 15 and the member 18 embraces the upper and lower sides of the axle A, with the lips 15$^a$ and 18$^a$ engaging the edges of the axle. The adjustment of the bolt 19 is such as to permit sliding movement of the device upon the axle so that it can be moved to the proper point thereon so as to define the innermost position of the corresponding spindle arm E. The device is adapted to be locked in adjusted position by means of the set screws 20 which, as shown in Fig. 3, have their inner ends engaging the vertical portion of the axle A and locked in such position by means of the lock nuts 21.

With the stopping devices applied to the axle in this manner, as shown in Fig. 1, it will be clear that when the spindle arms are moved inwardly they will abut the heads 17 thus preventing further inward movement of the same and thereby defining their innermost position. The stopping devices are adapted to be adjusted upon the axle A so that the spindle arms cannot move inwardly beyond the dead center point or to a point where the steering mechanism cannot move the spindle arm outwardly. With the devices arranged in such a position it will be clear that the steering apparatus cannot become locked and that it will at all times properly function to move the front wheels of the automobile to one extreme position or the other. Should there be any variance of the vertical position of the axle A due to bending of the radius rods, it will not interfere with the proper functioning of the stopping devices as they will maintain their proper positions with respect to the spindle arm at all times irrespective of the vertical position of the axle.

Although we have herein shown and described only two forms of stopping devices embodying our invention, it is to be understood that various changes and modifications may be made herein without departing from the spirit of the invention and the spirit and scope of the appended claims.

What we claim is:

1. A stopping device comprising, an L-shaped member, a laterally disposed arm formed on the member, said arm being curved longitudinally and formed at its rear end with a head, and a second member comprising a plate bolted to said arm and overlying the horizontal portion of the first member, and retaining lips formed on the edges of said members.

2. In combination, an axle, a spindle arm movably mounted on the axle, and a stopping device comprising a head disposed in the path of movement of the spindle arm and adapted to define the innermost position of said arm, and means for supporting said head in longitudinally adjusted position along the axle whereby the stopping position of the head can be varied to vary the innermost position of said arm.

PERCY D. BENBOW.
WILLIAM E. BECK.